# 2,874,605

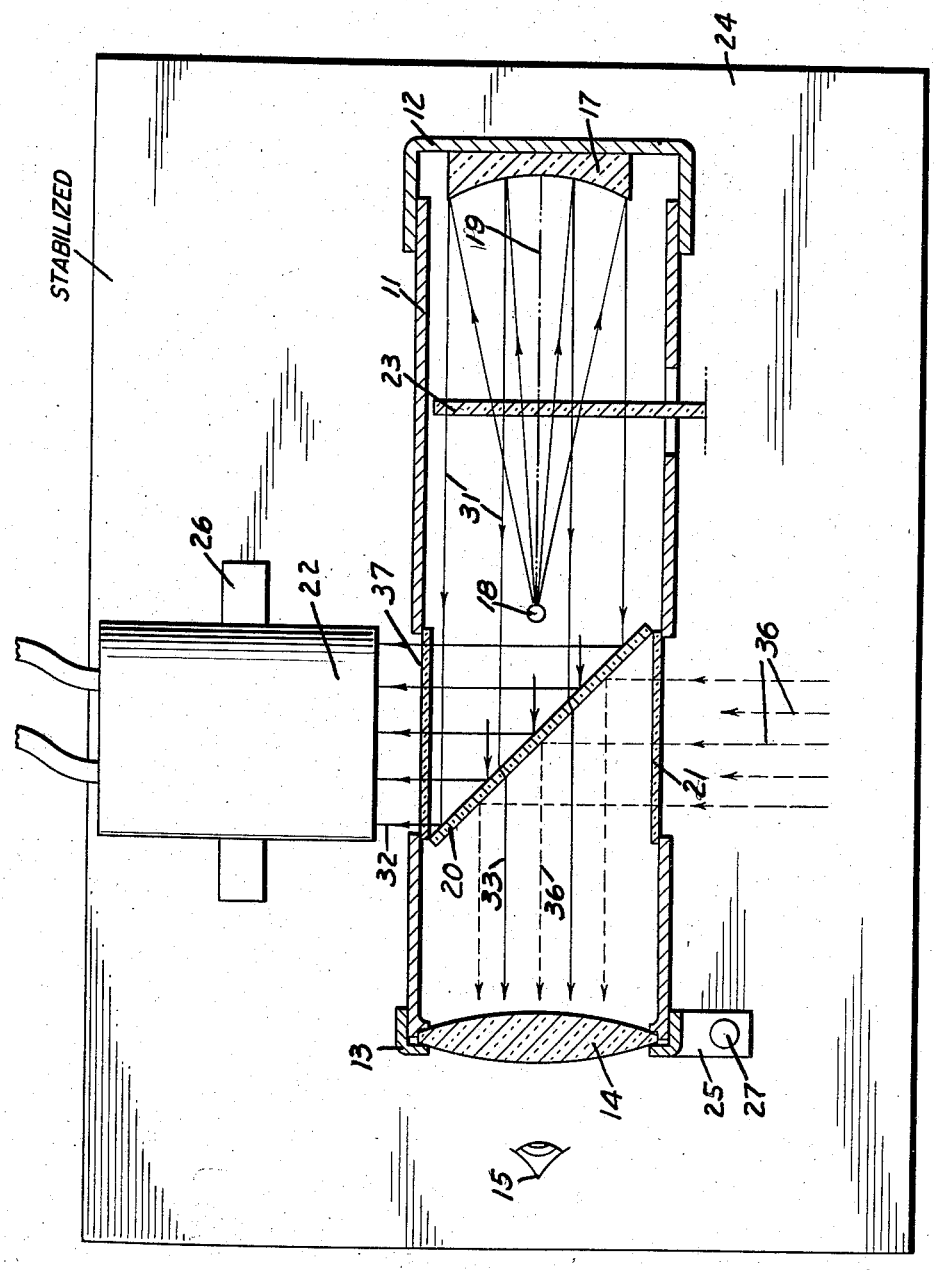

METHOD AND APPARATUS FOR ALIGNING RADIANT ENERGY DETECTOR CELLS WITH THE HORIZON

Donald E. Williamson, Lexington, Mass., assignor, by mesne assignments, to the United States of America as represented by the Secretary of the Navy Application September 13, 1954, Serial No. 455,804

11 Claims. (Cl. 88—14)

The present invention concerns a boresighter, and more particularly concerns a boresighter for use aboard ship to line up a passive detector cell on the horizon.

In the alignment of passive detector cells it has previously been necessary to use the costly procedure of taking two ships to sea, one of which was to act as the target for the other which had the cell for alignment. Alignment was then carried out by a cut and try process until the signals from the cell indicated that the cell was aligned on the horizon and properly oriented in azimuth. The only alternative to this procedure was to put a point source at a considerable distance from the cell, such as on a mast. This is convenient for alignment in azimuth but does not permit alignment in elevation if the ship is rolling or pitching.

This invention marks a departure from the prior art by providing a simple device which will allow the alignment of a cell upon any object located on the horizon whether or not that object is radiating energy in a wavelength region which the cell is capable of detecting and provided only that the object is visible to the naked eye and that its azimuth can be determined by other means. Previous to its introduction the lining up of a cell frequently required several days of effort. With the aid of the boresighter the necessary adjustments may be made in a matter of minutes.

The advantage of this device is that it is a selfcontained alignment apparatus which does not require the use of other ships or sea-borne sources.

An object of the invention is to provide a boresighter.

Another object is to provide a boresighter for use aboard ship to line up a passive detector cell on the horizon.

Another object is to provide a boresighter to provide alignment of a cell upon any object located on the horizon, whether or not such object is radiating energy in a wavelength region which the cell is capable of detecting and provided only that the object is visible to the naked eye and that its azimuth can be determined by other means.

Other objects and many of the attendant advantages of this invention will be readily appreciated as the same becomes better understood by reference to the following detailed description when considered in connection with the accompanying drawings wherein:

The single figure is a schematic diagram of the optical system of the boresighter. In the drawing there is shown a cylindrical metal tube 11 that is closed at one end by a cap 12 and at the other end is provided with a ring 13 for supporting an eyepiece 14. In substitution for eyepiece 14 there may be provided a transparent window or opening that serves as a viewing means. An observer's eye is indicated at 15. Supported in cap 12 is a concave spherical mirror 17 at the focal point of which is located a point source 18 of light that may be provided in conventional manner. Spherical mirror 17 and point source 18 establish an optical axis 19. Supported in tube 11 between spherical mirror 17 and eyepiece 14 and oriented at a 45° angle to the optical axis 19 and the parallel radiation reflected by mirror 17 from the point source 18 is a plane mirror 20 that is about 50% reflecting and 50% transmitting with respect to light. Tube 11 in the area around mirror 20 is provided with an annular transparent window or opening 21 to permit ingress of light from the horizon to mirror 20 and an annular transparent window or opening to permit egress of light from mirror 20, at 37 outwardly to a passive detector cell 22.

Traversing optical axis 19 and located between spherical mirror 17 and plane mirror 20 is a chopper 23. Chopper 23 serves to interrupt the radiation from points source 18 in order to provide an alternating current signal. Chopper 23 can comprise any conventional mechanism such as a rotating disk provided with suitable apertures. Instead of chopper 23, if desired, point source 18 may be connected with a power supply of pulsating direct current or low frequency alternating current which latter is preferable if the thermal inertia of the source is sufficiently low to permit its modulation.

A mounting head 24 is provided for supporting both tube 11 and cell 22. Tube 11 is fastened to mounting head 24 by a mounting back 25 and is rotatable about its axis 19 by adjustment screw 27. Cell 22 is rotatably supported on mounting head 24 by clamp 26. Cell 22 is adjustable both vertically and horizontally with respect to plane mirror 20 of the boresighter in order to bring the optical axis of cell 22 into coincidence with rays 32.

In order to adjust the cell 22 vertically and also horizontally with respect to plane mirror 20, cell 22 is positioned on an adjustable base or platform. Once the adjustment has been made the base is locked in position.

In order to hold cell 22 and tube 11 fixed with respect to one another, they are both mounted to a single platform or base 24. In order to rotate this whole assembly into alignment until the point source 18 as seen through the plane parallel glass 20 by the eye observer appears to be superimposed upon some suitable object on the horizon, the entire ensemble of cell, boresighter and related bases in its use is intended to be placed on a suitable and well known scanning table which in use may be rotated or elevated either directly by controls on the scanning table or remotely through servo loops from controls at a distant point.

Shown in solid line on the drawing are light rays 31 that emanate from point source 18 and are reflected by spherical mirror 17 to plane mirror 20, where part 32 of the rays are reflected to cell 22 and part 33 of the rays are transmitted to eyepiece 14. Shown in dotted lines on the drawing are light rays 36 from the horizon that are reflected by plane mirror 20 to eyepiece 14. Instead of the eyepiece 14, there may be if desired a transparent window or opening through which are viewed the rays 33 and 36.

The point light source 18 is located at the focal point of the spherical mirror 17 and is, therefore, imaged at infinity. The light rays 31 from the source 18 pass in part through the plane mirror 20 and some rays 33 reach the observer's eye. At the same time light rays 36 from the horizon are reflected from the plane mirror 20 and thus also reach the observer's eye. Since the source is imaged at infinity and the horizon is viewed at infinity, the eye sees the source superposed on a horizon background. A rotation of tube 11 about its axis causes no movement of the source image with respect to the observer. The rotation of tube 11 and therefore the plane mirror 20 does, however, cause a vertical displacement of the image of the horizon. The resulting effect as viewed by the observer is that the image of the horizon is raised or lowered relative to the image of the source. This rotation of the tube 11 is effected by the adjustment screw 27.

The rays 31 of light emanating from the spherical mirror will also be reflected in part by the plane mirror 20 as rays 32 to cell 22. It will be observed that due to the action of the concave spherical mirror 17, the apparent location of the point source 18 will be at infinity so far as the cell 22 is concerned. The plane mirror 20 is flat and its two faces are parallel. The angle of incidence of the rays 36 from the horizon to the plane mirror 20 is equal to the angle of reflection of the rays 36 from the plane mirror 20 to the observer. Also the angle of incidence of the collimated rays 31 of the source 18 at the plane mirror 20 is equal to the angle of reflection of the rays 32 from the plane mirror 20 to the cell 22. Since the reflected rays 36 are in coincidence with the rays 33, the rays 32 will be in coincidence with the rays 36 from the horizon that pass through the plane mirror.

In operation the cell may be oriented with respect to the boresighter until the signal from the cell 22 is maximum. This is accomplished by both vertical and horizontal adjustment of cell 22. In order to facilitate this operation it may be desirable to interrupt the radiation from the point source 18 by chopper 23 in order to provide an alternating current signal. The source 18 is modulated at the rate of seven cycles per second. During the adjustment of the receiving cell 22, the output of the heat sensing device such as thermistor, barometer, photo cell etc. (not shown) is fed into an oscilloscope. The position of the cell 22 is adjusted until a maximum signal is obtained. Then the optical axis of the cell 22 will be parallel to the rays 32. The optical axis of the cell 22 will then be pointed directly at the chosen horizon point since rays 32 are in coincidence with the rays 36 from that point.

Having aligned the boresighter with the cell 22, the combination is held fixed with respect to one another and the whole assembly is aligned until the point source 18 as seen through the plane parallel glass 20 by the eye of the observer appears to be superimposed upon some suitable object on the horizon whose azimuth can be determined for example, by means of the ship's pelorus. Due to the action of the plane parallel glass 20, the cell 22 will thus also be aligned upon the object, which alignment will be maintained when the boresighter is removed at the completion of the operation.

It is to be noted that infrared radiation which would affect cell 22 is handled entirely by reflecting surfaces, and that only visible radiation needs to pass through the plane parallel mirror 20. It is consequently convenient to use glass for this purpose. The glass may be partially silvered if desired to change the contrast between the apparent image of the point source and the object with which alignment is to be performed. It is also permissible to place filters between the boresighter and the object on the horizon provided that such filters do not introduce deviation of the rays. In use, the mounting board 24 which carries the cell 22 and the tube 11 is mounted on the usual scanning table, not shown, which is stabilized so that this table is not subject to the pitch and roll of the ship. These scanning tables and their stabilizing means are well known, and hence have not been illustrated or described in detail since the invention is not in the table or its stabilizing means, but in the mechanism carried by the table.

A concise statement of the operation is as follows: The source 18 in the tube radiates both light and heat, and some of the light rays 31 pass through the mirror 20 to the eye piece. The heat rays 31 from source 18 are reflected by the mirror 20 as are rays 32 to the heat sensitive cell 22. The parallel light rays 36 from the horizon are reflected by the mirror 20 to the eye piece. One rotates the tube 11 until the image of the horizon and the image of the source 18 coincide, as viewed at the eye piece. The heat rays striking cell 22 are reflected, as usual, by a spherical mirror in the back of the cell upon a bolometer or other heat sensitive unit, if the heat rays are parallel to the optical axis of the cell 22. Hence, after the tube has been rotated to bring the visual images of the horizon and of source 18 together, one then adjusts the cell 22 horizontally, vertically, or both, until maximum response in the oscilloscope is obtained, because that would indicate that the optical axis of the cell 22 is parallel to the rays from the horizon. The chopper 23 or suitable modulating means for the current supplied to the source 18 creates an A. C. or pulsating current that enables one more easily to ascertain from the variable current supplied to the oscilloscope, when maximum response of the cell 22 is obtained, since that indicates when the cell is properly aligned with the horizon. The tube 11 is then removed and by rotating the cell 22 carried by board or head 24 with the scanning table, it can sweep the horizon and pick up heat radiation from objects on the horizon. The use of tube 11 is not necessary again until a realignment should be necessary. The board or head 24 is mounted on the well known scanning table which is held stabilized against roll and pitch of the ship in the usual manner, which is not of itself the part in which this improvemnet is incorporated. If desired, the cell 22 may be aligned by adjustment relatively to tube 11 until the maximum response on the oscilloscope is obtained, and then the tube is rotated until the images of the horizon and source are caused to meet.

The cell and boresighter are stabilized against roll and pitch of the ship by the well known scanning table which is not shown because the invention here is in using on this old scanning table, the new boresighter to align the cell 22 with the horizon, and then the boresighter is removed. The cell 22 on the scanning table is old, and this invention is only in a new manner of, and construction for, aligning the cell with the horizon, using the old scanning table to stabilize the boresighter and cell against ship rolling and pitching.

Obviously many modifications and variations of the present invention are possible in the light of the above teachings. It is therefore to be understood that within the scope of the appended claims the invention may be practiced otherwise than as specifically described.

I claim:

1. A device for use on a ship for aligning a radiant energy detector cell with the horizon, in which the cell is mounted on the scanning table of a horizon scanning element which is held approximately horizontal at all times even during pitching and rolling of the ship, which comprises a mounting, a detector cell of the type which is responsive to radiant energy carried by said mounting and having an optical axis along which rays of radiant energy enter the cell, and a boresighter disposed on said mounting in front of said cell and extending crosswise of said optical axis, said boresighter including a casing, a compact, concentrated source of light in said casing intermediate of its ends and directing its light toward one end of the casing, a reflecting mirror at said one end of the casing and having a focus at said source of light and which is operable to reflect light and heat rays from said source as parallel rays toward the opposite end of said casing, said casing having a viewing window at the said opposite end of said casing, said casing having its wall which is in front of said cell light transmitting at opposite sides thereof, a plane mirror disposed obliquely across the interior of said casing between said source of light and said eyepiece, in front of said cell and in the casing section having the light transmitting wall, said mirror being disposed at an angle of substantially 45° to the optical axis of the parallel rays from said mirror and to the optical axis of said cell, and being partly reflecting and partly transmitting of light, uniformly over its entire face area, with respect to light incident thereon along both of said optical axes, and means enabling rotatable adjustment of said casting to a limited extent about its optical axis, until the image of said source and the horizon are approximately coincident as viewed at said eyepiece, said detector cell being adjustable on said mounting to enable alignment of its optical axis with the direction of the heat rays from said source as they are reflected by said plane mirror towards said cell.

2. A device for use on a ship for aligning a radiant energy detector cell with the horizon in which the cell is mounted on the scanning table of a horizontal scanning element which is held approximately horizontal at all times, even during pitching and rolling of the ship, which comprises a mounting head to be secured to said scanning table, a detector cell of the type responsive to radiant heat energy mounted on said head and having an optical axis along which rays of radiant heat energy enter said cell to activate it, a casing disposed on said head in front of said cell with its longitudinal axis disposed crosswise of and approximately intersecting the optical axis of said cell, a compact, concentrated source of light and heat in said casing at about the longitudinal axis of the casing and intermediate of its ends and directing light and heat rays towards one end of the casing, a concave reflecting mirror in said one end of said casing and having a focus at said source of light and heat and also a curvature operable to reflect light and heat rays from said source as substantially parallel rays along an optical axis toward the opposite end of the casing where the parallel light rays may be optically viewed, the portion of said casing in front of said cell being formed to pass therethrough light rays that are incident thereon in a direction crosswise of the said optical axis of said casing, a plane mirror disposed obliquely across the interior of said casing between said source of light and said opposite end of the casing, in front of said cell and said portion of the casing which passes light rays and oriented at an angle of substantially 45° to the optical axis of said parallel rays from said mirror and to the said optical axis of said cell, said plane mirror being partly light reflecting and partly light transmitting uniformly over its entire face area with respect to rays of radiant energy incident thereon along both of said optical axes, and directing to said opposite end of said casing a part of the light rays from said source and those entering the casing generally in a direction along the optical axis of said cell, and means for rotatably adjusting said casing to a limited extent about its optical axis and enable one to align at said opposite end of said casing an image of the horizon created by the light rays entering said casing through said portion of said casing and towards said cell but reflected toward said opposite end of the casing and an image of said source of light, said cell being adjustable on said head to align its optical axis with the heat rays from said source and reflected by said plane mirror toward said cell.

3. The device as set forth in claim 2, and an oscilloscope connected to said cell to indicate when maximum heat radiation along the optical axis of the cell is incident on said cell.

4. A device for use on a ship for aligning a radiant energy detector cell with the horizon in which the cell is mounted on the scanning table of a horizontal scanning element which is held approximately horizontal at all times, even during pitching and rolling of the ship, which comprises an elongated casing having viewing means at one end, a compact, concentrated source of light within said casing intermediate of its ends and directing light and heat rays therefrom toward the other end of the casing, a concave reflecting mirror disposed in said casing at said other end of the casing and having its focus at said source of light, and operable to reflect light and heat rays incident thereon from said source as approximately parallel rays toward said viewing means, the portion of said casing between said viewing means end and said source of light having a structure capable of passing light rays which are incident thereon in a direction crosswise of the length of the casing, a plane mirror partly reflecting and partly passing light rays that are incident thereon at angles of about 45° to its faces, uniformly over its entire face area, disposed in said casing, in said portion thereof through which radiant energy rays may pass, at an angle of about 45° to the length of said casing, whereby when said casing with its contents is mounted on a horizontal scanning table of a ship, with its longitudinal axis horizontal and with a radiant energy activated detector cell on said table and oriented thereon to place its optical axis of activating rays horizontal, and alongside of and aligned with said portion of the casing through which radiant energy rays may pass, one may, by adjustment of said casing about its own longitudinal axis align an image of the horizon with an image of said source of light at said viewing means, and then adjust said cell relatively to said horizon until heat rays reflected to said cell by said mirror show maximum activation of the cell.

5. A device for use on ships in aligning with the horizon on a horizontal scanning table, a detector cell that is activated by radiant energy rays, which comprises a generally cylindrical casing formed at one end for optical viewing of the interior of the casing, a concave reflecting mirror in said casing adjacent the opposite end thereof and facing said one end, a compact, concentrated source of light in said casing intermediate of its ends, disposed for directing light and heat rays against said mirror to be reflected thereby toward said one end of the casing, and located at the focus of the mirror to cause the light and heat rays reflected by the mirror to travel substantially parallel towards said one end of the casing, a plane mirror partly transmitting and partly reflecting any radiant energy rays incident thereon at an angle of about 45°, uniformly over its face area, disposed in said casing between said light source and said one viewing end of the casing in an oblique position of about 45° to the parallel rays traveling from said mirror toward said one end of the casing, the wall of that portion of said casing in which said plane mirror is placed being light transparent for passing therethrough, radiant energy rays incident thereon from the exterior of the casing against said plane mirror in a horizontal direction transverse to the longitudinal axis of said casing.

6. The device as set forth in claim 5, and a screw adjustably carried by said casing for engagement with said table against which said casing may be confined for determining the rotary angular position of said casing on said table when confined thereagainst.

7. The boresighter as set forth in claim 5, and said detector cell disposed at the opposite side of said casing from the incidence of the radiant energy rays on the casing, and in the path of heat rays from said source that are reflected first by said concave mirror and then by said plane mirror and means mounting said cell relatively to said casing for limited adjustment until it has maximum response to the heat rays from said source that are reflected to it by said plane mirror.

8. The boresighter as set forth in claim 5, wherein said wall of that portion of said casing in which said mirror is placed is an annular transparent wall.

9. The boresighter as set forth in claim 5, and means for causing pulsations of the light and heat rays from said source that are incident on said concave mirror, whereby when said cell is connected to an oscilloscope, the maximum activation of said cell by rays of radiant energy from said source reflected thereto by said mirrors may be easily ascertained.

10. The method of aligning, with the horizon, on a uniformly horizontal scanning table, the optical axis of a detector cell that is activated by radiant energy rays, which comprises mounting said cell on said table with the optical axis of the cell approximately parallel to the horizontal surface of said table, disposing transversely across said optical axis a plane mirror that is partly reflecting and partly light transmitting, uniformly over its ray transmitting face area, with the plane faces of the mirror making an angle of approximately 45° with said optical axis and approximately normal to said horizontal table surface, projecting parallel light and heat rays from a small source of light at an angle of 45° against that face of said mirror which faces said cell, whereby some light rays will pass through said mirror, arranging said mirror to pass approximately horizontal light rays from the horizon against the opposite face of said mirror, some of which will be reflected by the mirror in the same direction and along about the same path as the parallel light rays from said source that pass through said mirror, rotating angularly said mirror on the optical axis of said parallel rays from said source that pass through the mirror until the image of said source of light created by said parallel light rays is substantially coincident with said horizon as viewed from a position along said optical axis of said parallel rays from said source, then adjusting the cell relatively to said mirror until the said heat rays from said source and reflected by said mirror to said cell give maximum activation to the cell, and then removing said mirror from in front of said cell to enable radiant energy rays from the horizon to enter said cell.

11. The method of aligning the optical axis of a detector cell that is activated by radiant energy rays from the horizon, on a uniformly horizontal scanning table, which comprises mounting on the horizontal surface of said table a plane mirror disposed with its faces normal to the said horizontal surface and which partly reflects and partly passes light rays uniformly over its ray transmitting face area, projecting parallel light rays from a small source of light along an optical axis at an angle of about 45° against one face of said mirror, whereby some rays will be reflected by the mirror and some will pass through it in the same direction, directing approximately horizontal light rays from about the horizon against the opposite face of said mirror at an angle of about 45° thereto, some of which will be reflected by said mirror in the same direction as and along with the light rays from said source passing through said mirror, angularly adjusting said mirror on said optical axis until the light rays from said source and passed by said mirror and the light rays from the horizon and reflected by said mirror indicate images of the horizon and light source as approximately coincident, disposing a detector cell along the optical axis of the rays from said source after they have been reflected by the mirror, with the optical axis of the cell approximately coincident with the optical axis of the rays reflected to the cell by said mirror, and modulating the light from said source to a small rate per second, and visually indicating the output of said cell while adjusting the position of the cell relatively to said mirror until the cell indicates a maximum output, and then removing said mirror.

References Cited in the file of this patent

UNITED STATES PATENTS

| | | |
|---|---|---|
| 2,313,204 | Morelle | Mar. 9, 1943 |
| 2,358,316 | Chwalow | Sept. 19, 1944 |
| 2,401,691 | Luboshez | June 4, 1946 |
| 2,405,063 | Sisson | July 30, 1946 |
| 2,407,467 | Barry | Sept. 10, 1946 |
| 2,472,380 | Long | June 7, 1949 |
| 2,705,758 | Kaprelian | Apr. 5, 1955 |

FOREIGN PATENTS

| | | |
|---|---|---|
| 1,074,351 | France | Mar. 31, 1954 |